(12) United States Patent
Streppel

(10) Patent No.: US 10,480,748 B2
(45) Date of Patent: Nov. 19, 2019

(54) LENS AND OPTOELECTRONIC LIGHTING DEVICE

(71) Applicant: OSRAM Opto Semiconductors GmbH, Regensburg (DE)

(72) Inventor: Ulrich Streppel, Regensburg (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 109 days.

(21) Appl. No.: 15/572,551

(22) PCT Filed: May 10, 2016

(86) PCT No.: PCT/EP2016/060411
§ 371 (c)(1),
(2) Date: Nov. 8, 2017

(87) PCT Pub. No.: WO2016/180814
PCT Pub. Date: Nov. 17, 2016

(65) Prior Publication Data
US 2018/0112848 A1    Apr. 26, 2018

(30) Foreign Application Priority Data
May 12, 2015   (DE) .................. 10 2015 107 443

(51) Int. Cl.
*F21V 5/00*    (2018.01)
*G02B 19/00*   (2006.01)
(Continued)

(52) U.S. Cl.
CPC .............. *F21V 5/007* (2013.01); *F21V 5/004* (2013.01); *F21V 5/04* (2013.01); *F21V 7/22* (2013.01);
(Continued)

(58) Field of Classification Search
CPC . F21V 5/004; F21V 5/007; F21V 5/02; F21V 5/04; F21V 7/22; F21Y 2115/10;
(Continued)

(56) References Cited

U.S. PATENT DOCUMENTS 5,841,596 A * 11/1998 Perlo .................... G02B 5/1876
                                                            359/859
7,855,335 B2 * 12/2010 Maeda ............... G02B 19/0042
                                                            136/246
(Continued)

FOREIGN PATENT DOCUMENTS

CN        201852038 U      6/2011
CN        102829430 A     12/2012
(Continued)

OTHER PUBLICATIONS

First Office Action dated Mar. 14, 2019, of counterpart Chinese Application No. 201680027407.0. along with an English translation.

Primary Examiner — Tsion Tumebo
(74) Attorney, Agent, or Firm — DLA Piper LLP (US)

(57) ABSTRACT

A lens includes a base body having a light incidence face through which light can enter the base body and a light exit face, through which light which has entered the base body can emerge, the light exit face includes a microlens structure having a plurality of microlenses, the light incidence face has at least two collimator segments that collimate light and a light entry region formed differently from the collimator segments, the base body has at least two back-reflection regions respectively assigned to one of the two collimator segments, to reflect back light collimated by a corresponding collimator segment, in a direction of the corresponding collimator segment, and the base body is a reflection region to reflect light that has entered through the light incidence
(Continued)

region in the direction of the microlens structure so that the reflected light can emerge from the base body through the microlens structure.

19 Claims, 7 Drawing Sheets

(51) Int. Cl.
| | | |
|---|---|---|
| *G03B 15/05* | (2006.01) | |
| *G02B 27/09* | (2006.01) | |
| *F21V 5/04* | (2006.01) | |
| *F21V 7/22* | (2018.01) | |
| *G02B 27/30* | (2006.01) | |
| *F21Y 115/10* | (2016.01) | |
| *F21V 5/02* | (2006.01) | |

(52) U.S. Cl.
CPC ..... *G02B 19/0028* (2013.01); *G02B 19/0066* (2013.01); *G02B 27/0905* (2013.01); *G02B 27/0938* (2013.01); *G02B 27/30* (2013.01); *G03B 15/05* (2013.01); *F21V 5/02* (2013.01); *F21Y 2115/10* (2016.08); *G03B 2215/0567* (2013.01); *G03B 2215/0582* (2013.01)

(58) Field of Classification Search
CPC ............ G02B 19/0028; G02B 19/0066; G02B 27/0905; G02B 27/0938; G02B 27/30; G03B 15/05; G03B 2215/0567; G03B 2215/0582
See application file for complete search history.

(56) References Cited

U.S. PATENT DOCUMENTS

| | | | |
|---|---|---|---|
| 9,683,716 B2* | 6/2017 | Wang | G02B 3/08 |
| 2004/0070855 A1* | 4/2004 | Benitez | G02B 3/02 |
| | | | 359/858 |
| 2005/0180690 A1* | 8/2005 | Sugiyama | B29C 33/3842 |
| | | | 385/33 |
| 2006/0044806 A1 | 3/2006 | Abramov et al. | |
| 2007/0268694 A1 | 11/2007 | Bailey et al. | |
| 2008/0047605 A1* | 2/2008 | Benitez | G02B 17/086 |
| | | | 136/259 |
| 2008/0106910 A1 | 5/2008 | Bollea et al. | |
| 2010/0178046 A1* | 7/2010 | Moon | F21L 4/02 |
| | | | 396/155 |
| 2013/0265772 A1 | 10/2013 | Lu et al. | |

FOREIGN PATENT DOCUMENTS

| | | |
|---|---|---|
| CN | 103733093 A | 4/2014 |
| CN | 205560626 U | 9/2016 |
| DE | 102 14 566 A1 | 10/2003 |
| DE | 10 2011 002 483 A1 | 7/2011 |
| DE | 10 2011 075 753 A1 | 6/2012 |
| WO | 2009/153326 A1 | 12/2009 |
| WO | 2014/016227 A1 | 1/2014 |

* cited by examiner

LENS AND OPTOELECTRONIC LIGHTING DEVICE

TECHNICAL FIELD

This disclosure relates to a lens, to an optoelectronic lighting device, and to a mobile terminal.

BACKGROUND

Mobile terminals, for example, cell phones sometimes contain flash LEDs (LED: light-emitting diode). In the event of a plurality of flash LEDs that emit light of different colors, color mixing of the colors of the emitted light is possible. Conventionally, each of the LEDs has its own lens, which respectively projects the emitted light in a particular spatial direction.

For example, WO 214/016227 A1 discloses a lens for a lighting device. DE 10 2011 075 753 A1 discloses a dental treatment light.

It could therefore be helpful to provide an efficient optical projection of light emitted by light-emitting faces of optoelectronic semiconductor components.

SUMMARY

I provide a lens including a base body, wherein the base body has a light incidence face through which light can enter the base body, the base body has a light exit face through which light which has entered the base body can emerge, the light exit face includes a microlens structure having a plurality of microlenses, the light incidence face has at least two collimator segments that collimate light, the light incidence face has a light entry region formed differently from the collimator segments, the base body has at least two back-reflection regions respectively assigned to one of the two collimator segments to reflect back light collimated by a corresponding collimator segment in a direction of the corresponding collimator segment, and the base body is a reflection region to reflect light that has entered through the light incidence region, in the direction of the microlens structure so that the reflected light can emerge from the base body through the microlens structure.

I also provide an optoelectronic light device including the lens including a base body, wherein the base body has a light incidence face through which light can enter the base body, the base body has a light exit face through which light which has entered the base body can emerge, the light exit face includes a microlens structure having a plurality of microlenses, the light incidence face has at least two collimator segments that collimate light, the light incidence face has a light entry region formed differently from the collimator segments, the base body has at least two back-reflection regions respectively assigned to one of the two collimator segments to reflect back light collimated by a corresponding collimator segment in a direction of the corresponding collimator segment, and the base body is a reflection region to reflect light that has entered through the light incidence region, in the direction of the microlens structure so that the reflected light can emerge from the base body through the microlens structure, and a plurality of optoelectronic semiconductor components respectively having a light-emitting face facing toward the light incidence face, wherein the plurality of semiconductor components are respectively assigned to one of the collimator segments so that light emitted by the respective light-emitting face of the semiconductor components can be partially collimated by the assigned collimator segment, the collimated light can be reflected back in the direction of the collimator segment by the corresponding back-reflection region, and can be collimated by the collimator segment in the direction of the light-emitting face, and so that the light emitted by the respective light-emitting face of the semiconductor components can enter the base body partially through the light incidence region, can be reflected by the back-reflection region in the direction of the microlens structure, and can emerge from the base body through the microlens structure.

I further provide a mobile terminal including the optoelectronic light device including the lens including a base body, wherein the base body has a light incidence face through which light can enter the base body, the base body has a light exit face through which light which has entered the base body can emerge, the light exit face includes a microlens structure having a plurality of microlenses, the light incidence face has at least two collimator segments that collimate light, the light incidence face has a light entry region formed differently from the collimator segments, the base body has at least two back-reflection regions respectively assigned to one of the two collimator segments to reflect back light collimated by a corresponding collimator segment in a direction of the corresponding collimator segment, and the base body is a reflection region to reflect light that has entered through the light incidence region, in the direction of the microlens structure so that the reflected light can emerge from the base body through the microlens structure, and a plurality of optoelectronic semiconductor components respectively having a light-emitting face facing toward the light incidence face, wherein the plurality of semiconductor components are respectively assigned to one of the collimator segments so that light emitted by the respective light-emitting face of the semiconductor components can be partially collimated by the assigned collimator segment, the collimated light can be reflected back in the direction of the collimator segment by the corresponding back-reflection region, and can be collimated by the collimator segment in the direction of the light-emitting face, and so that the light emitted by the respective light-emitting face of the semiconductor components can enter the base body partially through the light incidence region, can be reflected by the back-reflection region in the direction of the microlens structure, and can emerge from the base body through the microlens structure.

LIST OF REFERENCES

Figure 1:
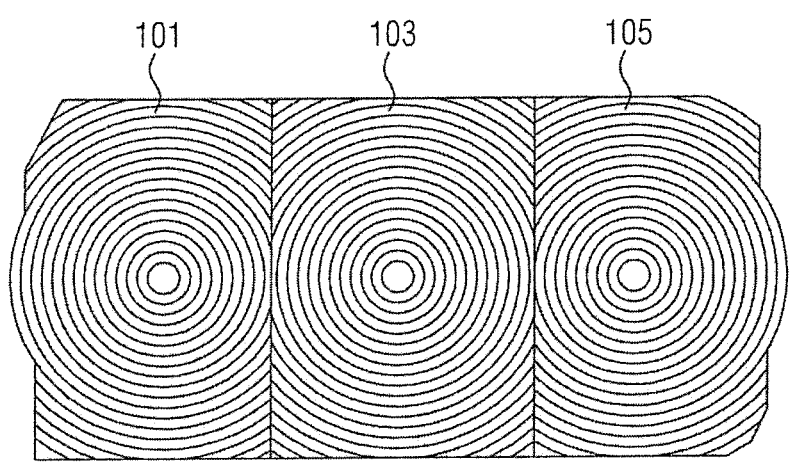
FIGS. 1 and 2 respectively show known lenses.

- 101 lens
- 103 lens
- 105 lens
- 201 lens
- 203 lens
- 205 lens
- 207 lens
- 301 lens
- 303 front side
- 305 rear side
- 307 base body
- 309 light incidence face
- 311 light exit face
- 313 microlens structure
- 315 microlenses
- 317 mounting flange
- 319 depression
- 321 back-reflection region
- 323 back-reflection region
- 325 back-reflection region
- 327 back-reflection region
- 329 prism rings
- 331 facet
- 333 arcuate section
- 335 arcuate section
- 337 arcuate section
- 339 arcuate section
- 401 mounting flange face
- 403 collimator segment
- 405 collimator segment
- 407 collimator segment
- 409 collimator segment
- 411 light incidence region
- 413 depression
- 501 optoelectronic semiconductor component
- 503 light-emitting face
- 505 optical axis
- 507 normal vector
- 509 midpoint
- 511 side length
- 513 prism
- 515 excerpt
- 601 incident light
- 603 collimated light
- 605 prism face
- 607 prism face
- 609 base face
- 611 reflected light
- 613 reflected light
- 615 collimated light
- 701 optoelectronic semiconductor component
- 703 light-emitting face
- 801 incident light
- 803 collimated light
- 901 refracted light
- 903 projected light
- 1001 housing
- 1003 side wall
- 1005 side wall
- 1007 side wall
- 1009 side wall
- 1011 interior
- 1013 recess
- 1015 further recess
- 1017 optoelectronic semiconductor component
- 1019 optoelectronic semiconductor component
- 1021 optoelectronic semiconductor component
- 1023 optoelectronic semiconductor component
- 1025 light-emitting face
- 1027 light-emitting face
- 1029 light-emitting face
- 1031 light-emitting face
- 1033 carrier surface
- 1035 carrier
- 1037 face
- 1039 mounting face
- 1101 angle
- 1201 lens ring
- 1203 lens ring
- 1205 lens ring
- 1207 lens ring
- 1301 mobile terminal
- 1303 optoelectronic lighting device

DETAILED DESCRIPTION

A lens may comprise:

a base body, wherein the base body has a light incidence face through which light can enter the base body, the base body has a light exit face through which light which has entered the base body can emerge, the light exit face comprises a microlens structure having a plurality of microlenses, the light incidence face has at least two collimator segments for collimating light, the light incidence face has a light entry region formed differently from the collimator segments, the base body has at least two back-reflection regions respectively assigned to one of the two collimator segments to reflect back the light, collimated by the corresponding collimator segment in the direction of the corresponding collimator segment, and the base body is a reflection region for reflecting light, which has entered through the light incidence region, in the direction of the microlens structure so that the reflected light can emerge from the base body through the microlens structure.

An optoelectronic lighting device may comprise:

the lens, and a plurality of optoelectronic semiconductor components, respectively having a light-emitting face facing toward the light incidence face, wherein the plurality of semiconductor components are respectively assigned to one of the collimator segments so that light emitted by the respective light-emitting face of the semiconductor components can be partially collimated by the assigned collimator segment, the collimated light can be reflected back in the direction of the collimator segment by the corresponding back-reflection region, and can be collimated by the collimator segment in the direction of the light-emitting face, and so that the light emitted by the respective light-emitting face of the semiconductor components can enter the base body partially through the light incidence region, can be reflected by the back-reflection region in the direction of the microlens structure, and can emerge from the base body through the microlens structure.

A mobile terminal may comprise the optoelectronic lighting device.

We thus provide a lens having two functions. On the one hand, some of the light emitted by the light-emitting faces is reflected back again in the direction of the light-emitting faces. This is done by the provision of the collimator segments and the assigned back-reflection regions. On the other hand, the light emitted by the light-emitting faces is optically projected by the microlens structure so that a predetermined emission characteristic can advantageously be adjusted.

This, in particular, thus leads to the technical advantage that efficient optical projection of the emitted light can be achieved.

The back-reflection regions respectively may comprise one or more prism rings, concentric relative to the optical axis of the collimator segment assigned to the corresponding back-reflection region, comprising a plurality of prisms for total reflection of the collimated light.

This, in particular, leads to the technical advantage that efficient back-reflection can be achieved. A prism ring comprises, in particular, a plurality of prisms arranged annularly, i.e., along or on a ring. Annularly means, in particular, circularly. Concentrically relative to the optical axis means, in particular, that a center or midpoint of a prism ring lies on the optical axis of the assigned collimator segment. The concentric prism rings of a back-reflection region thus all have a common midpoint with different diameters.

An angle between a respective prism face of the prisms of the one or more prism rings and of the corresponding optical axis of the assigned collimator segment may be 40° to 50°.

This, in particular, leads to the technical advantage that efficient total reflection can be achieved.

A respective prism face of the prisms may have a curvature, in particular a spherical, aspherical, convex or concave curvature.

This, in particular, leads to the technical advantage that efficient back-reflection of the collimated light can be achieved.

The microlenses may be formed as aspherical, rotationally symmetrical microlenses respectively having an equal asphericity coefficient or at least partially different asphericity coefficients.

This, in particular, leads to the technical advantage that the microlenses can optically project the light reflected by the reflection region in an efficient manner. In this way, for example, a particular emission characteristic can advantageously be adjusted. Thus, for example, it is advantageously possible to achieve the effect that, in the case of a plurality of optoelectronic components emitting light of different wavelengths, color mixing can be carried out such that the emission in a plurality of angle ranges always has an identical (mixed) color, irrespective of which of the optoelectronic semiconductor components are switched on or off.

The reflection region may comprise a plurality of facets that collimate the incident light in the direction of the microlens structure.

This, in particular, leads to the technical advantage that efficient reflection of the incident light can be achieved in the direction of the microlens structure.

The facets respectively may have a curvature.

This, in particular, leads to the technical advantage that efficient collimation can be obtained. In particular, collimation can thereby be obtained in a further spatial direction, i.e., in addition to the collimation spatial direction of a planar or flat facet.

The base body may be free from a reflection coating. This, in particular, leads to the technical advantage that no reflection losses, which coatings always exhibit, occur. In contrast with this, total reflection always has 100% reflectivity (cf. also the example comprising a plurality of prisms).

The base body may be configured as a one-piece base body.

This, in particular, leads to the technical advantage that simple and efficient manufacture of the base body can be achieved.

The base body may be formed as an injection-molded component.

This, in particular, leads to the technical advantage that the base body can be produced efficiently and simply. This, in particular, by an injection-molding process.

The base body may be formed as a one-piece injection-molded component.

The base body may comprise a mounting flange, extending around the microlens structure to mount the base body on a housing.

This, in particular, leads to the technical advantage that efficient and simple mounting of the base body on a housing is made possible. The housing may, for example, accommodate the semiconductor components.

The collimator segments may be respectively formed as a collimator lens.

This, in particular, leads to the technical advantage that efficient collimation can be achieved.

A collimator lens is, in particular, a converging lens or a convex lens. The collimator lens may, for example, be a biconvex, planoconvex or concave-convex lens.

The collimator segments are formed in a depression, bounded by the light incidence region, of the base body.

This, in particular, leads to the technical advantage that efficient input of light into the base body can be achieved, here in particular through the light incidence region.

A respective separating face formed between the semiconductor components may have a reflection coating for reflecting light in the direction of the light incidence face.

This, in particular, leads to the technical advantage that light output from the base body can be improved. This is in particular because light that has been reflected back by the back-reflection regions in the direction of the semiconductor components can be reflected again away from the semiconductor components because of the reflection coating on the separating face. In particular, this reflected light can therefore enter or be introduced into the base body through the light incidence region and then be reflected by the reflection region to the microlens structure. This thus means that the light reflected back by the back-reflection regions can be reused efficiently.

A housing having a recess may be provided, the semiconductor components being arranged in the housing with the light-emitting faces facing toward the recess, the recess being covered by the base body.

This, in particular, leads to the technical advantage that the semiconductor components can be protected against robust ambient conditions. In particular, the housing leads to mechanical protection for the semiconductor components. In particular, such a housing can be installed simply and efficiently into a mobile terminal.

The housing may be formed as a light box. A light box has, in particular, walls with a high reflectivity, preferably with a Lambertian emission characteristic. The walls are, for example, formed or configured such that the output of the light from the box is maximal. A housing is intended, in particular, to mean a mechanical apparatus accommodating and holding semiconductor chips (in general optoelectronic semiconductor components) and the lens. A housing need not necessarily have a primary optical functionality, although it may do.

The housing may comprise a plurality of housing side walls enclosing a housing interior, a respective face, facing toward the housing interior, of the housing side walls having a reflection coating.

This, in particular, leads to the technical advantage that light output from the housing can be efficiently improved.

The housing may have a mounting face extending around the recess, the mounting flange of the base body being arranged on the mounting face.

This, in particular, leads to the technical advantage that efficient mounting of the base body on the housing can be achieved.

The semiconductor components may be arranged rectangularly, hexagonally or circularly.

When there are more than 4 chips, it is important to have the best possible symmetry match to the lens (as far as possible point-symmetrical) and at the same time a high packing density. This leads to hexagonal and circular arrangements of the semiconductor components. This means that an efficient symmetry match, in particular a point-symmetrical symmetry match, to the lens can advantageously be achieved because of the hexagonal and circular arrangements.

The semiconductor components may be configured to emit light of a respectively different wavelength.

This, in particular, leads to the technical advantage that the optoelectronic lighting device can emit light of different wavelengths. In particular, color mixing can thereby be carried out. This thus means that, for example, light of different waves can be mixed. In this way, a multiplicity of colors can advantageously be emitted.

For example, an optoelectronic semiconductor component may emit red light. Red light has, in particular, a wavelength of more than 600 nm.

In particular, an optoelectronic semiconductor component may emit green light. Green light has, in particular, a wavelength of 520 nm to 565 nm.

In particular, an optoelectronic semiconductor component may emit yellow light. Yellow light has, in particular, a wavelength of 565 nm to 575 nm.

In particular, an optoelectronic semiconductor component may emit blue light. Blue light has, in particular, a wavelength of 460 nm to 480 nm.

This thus means, in particular, that the semiconductor components may, for example, respectively emit red, green, yellow or blue light.

In a plurality of optoelectronic semiconductor components, they may emit light of different shades of white, that is to say they are correspondingly configured to emit light of different shades of white. The emitted light thus has different color temperatures. A color temperature may, for example, be about 2000 K (i.e., warm white light). A color temperature may, for example, be about 5500 K (i.e., cold white light).

An optoelectronic component (or a plurality of optoelectronic components) may be configured to emit white light. This may, for example, be achieved by the semiconductor component emitting primarily blue light (primary light), which is converted into white light (secondary light) by a conversion layer, for example, a phosphor conversion layer. The semiconductor component comprises such a conversion layer, for example. Thus, an optoelectronic component (or a plurality of optoelectronic components) comprising such a conversion layer may be configured to emit blue light converted into white light by the conversion layer so that the semiconductor component emits white light. The conversion of blue light into white light is thus based, in particular, on a phosphor conversion. The conversion layer may, for example, be arranged in an emission region of the optoelectronic semiconductor component, and at a distance from the latter.

A respective optical axis of the collimator segments and a respective normal vector extending through a midpoint of the light-emitting faces may have a lateral offset with respect to one another, which is equal to at most 30% of a side length of the corresponding light-emitting face.

This, in particular, leads to the technical advantage that efficient alignment or adjustment of the light-emitting face relative to the collimator segments can be made possible. This is because, owing to the predetermined maximum delimitation in respect of the lateral offset, it is advantageously furthermore possible to ensure that efficient collimation can be carried out. This permitted or allowed tolerance is, however, sufficient to simplify an adjustment step. In particular, manufacture can be simplified in this way.

The lighting device may be configured as a flash.

This, in particular, leads to the technical advantage that the optoelectronic lighting device can be used as a flash in a mobile terminal.

A respective side length of the semiconductor components may at most be 1 mm, and/or wherein a respective distance between two optoelectronic semiconductor components is 50 µm to 100 µm.

This, in particular, leads to the technical advantage that efficient miniaturization can be achieved. In particular, a correspondingly smaller housing is sufficient in such a case, which can save on material compared to a larger housing. In particular, this makes it possible to efficiently use an existing installation space in a mobile terminal.

The mobile terminal may be a smart phone or a cell phone.

Precisely two optoelectronic semiconductor components may be provided.

Precisely four optoelectronic semiconductor components may be provided.

The number of optoelectronic semiconductor components may correspond to the number of collimator segments.

Each collimator segment may be assigned precisely one optoelectronic semiconductor component.

The optoelectronic semiconductor components may be respectively formed as a light-emitting diode. A light-emitting diode may, for example, be referred to as a light-emitting diode. Such a diode is referred to as a light-emitting diode (LED). The light-emitting diode is, for example, an organic or inorganic light-emitting diode.

The semiconductor component may be formed as a semiconductor chip.

The light-emitting diode may be formed as a light-emitting diode chip.

The light-emitting diode may be a laser diode, in particular a laser diode chip.

When a semiconductor component is described in the light of this description, this is always intended to mean an optoelectronic semiconductor component. This means that the adjective "optoelectronic" does not always stand before the term "semiconductor component."

The above-described properties, features and advantages, as well as the way in which they are achieved, will become more clearly and readily comprehensible in conjunction with the following description of the examples, which will be explained in more detail in connection with the drawings.

The same references may be used for identical features. Furthermore, for the sake of clarity, not all references for the individual elements are indicated in the drawings.

FIG. 1 shows three known lenses 101, 103, 105, which may be used as individual single optical elements in known flashes. Such known flashes herein comprise a plurality of LEDs, which respectively receive an individual single optical element. This thus means that the known lens 101 projects light of one LED. The known lens 103 projects light of a further LED. The known lens 105 projects light of a further LED.

Figure 2:
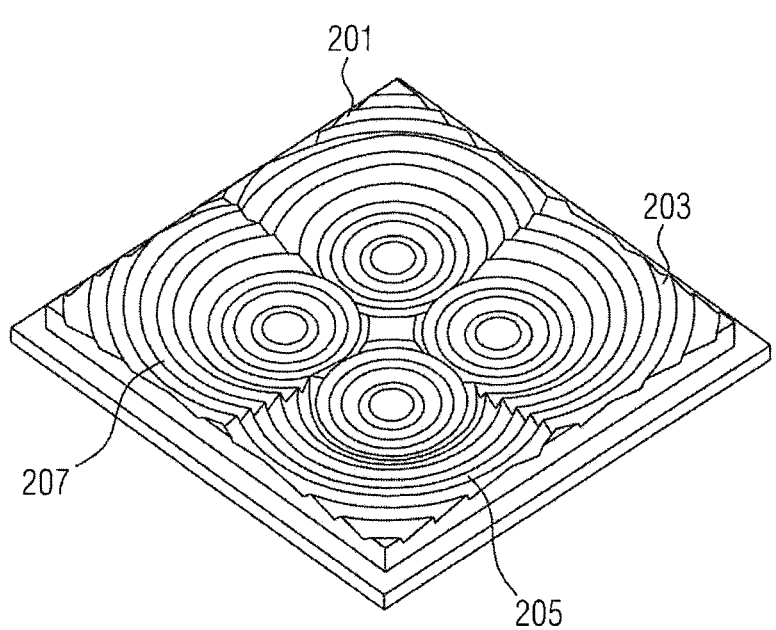

FIG. 2 shows four known lenses 201, 203, 205, 207 in a square arrangement. In a similar way to FIG. 1, the known lenses 201, 203, 205, 207 respectively individually project light of a single LED.

Because of the known concept that each LED receives an individual single optical element, here the known lenses 101, 103, 105, 201, 203, 205, 207, the LEDs generally need to have a relatively large spacing from one another. Miniaturization, as is required, for example, for flash applications in mobile terminals, is therefore difficult or even impossible.

Figure 3:
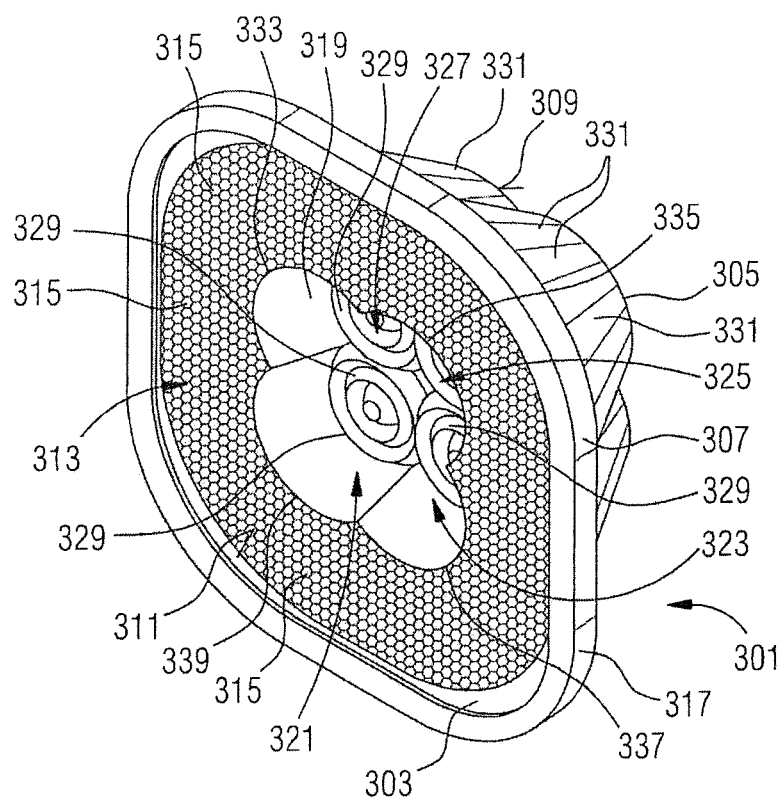
FIG. 3 shows a lens according to one example in an oblique plan view of the front side of the lens.

FIG. 3 shows a lens 301 according to one example in an oblique plan view of the front side 303 of the lens 301.

The lens 301 has a rear side 305 lying opposite the front side 303.

The front side 303 of the lens 301 generally refers to the side of the lens 301 facing toward an observer in the mounted state, i.e., when the lens 301 is part of the optoelectronic lighting device. The rear side 305 generally faces away from the observer in this mounted state.

The lens 301 has a base body 307. The base body 307 comprises a light incidence face 309, through which light can enter or be introduced into the base body 307. The base body 307 has a light exit face 311, through which light which has entered the base body 307 can emerge.

In this case, the light incidence face 309 is part of the rear side 305 of the lens 301. The light exit face 311 is part of the front side 303 of the lens 301.

The light exit face 311 comprises a microlens structure 313. The microlens structure 313 has a plurality of microlenses 315.

These microlenses 315 can optically project light. Depending on lens properties of the microlenses 315, a predetermined emission characteristic of light can therefore advantageously be adjusted or achieved.

The base body 307 furthermore has a mounting flange 317 that is formed extending around the microlens structure 313. The mounting flange 317 has a square shape having rounded edges. The mounting flange 317 is used to mount the lens 301 on a housing of an optoelectronic lighting device as will be explained in more detail below.

The base body 307 has a depression 319 in relation to the light exit face 311. This thus means that the light exit face 311 has a depression 319. This depression 319 may, for example, be referred to as a cavity.

The depression 319 is formed centrally on the light exit face 311.

Arranged in a bottom region, which is not shown here in detail, of the cavity 319, there are four back-reflection regions 321, 323, 325, 327, which respectively comprise a plurality of prism rings 329.

The prism rings 329 and the back-reflection regions 321, 323, 325, 327 will be explained in more detail below.

The base body 307 furthermore has a plurality of facets 331, which can collimate light in the direction of the microlenses 315, as will be explained in more detail below.

A contour of the cavity 319 relative to the light exit face 311 has a rosette shape. This rosette shape comprises four arcuate sections 333, 335, 337 and 339. In this case, the number of arcuate sections 333, 335, 337, 339 corresponds a number of back-reflection regions 321, 323, 325, 327. This thus means that, for example, when two back-reflection regions are provided, two arcuate sections are formed. In the case of four back-reflection regions, for example, four arcuate sections are formed.

The base body 307 is, for example, formed as an injection-molded component.

Figure 4:
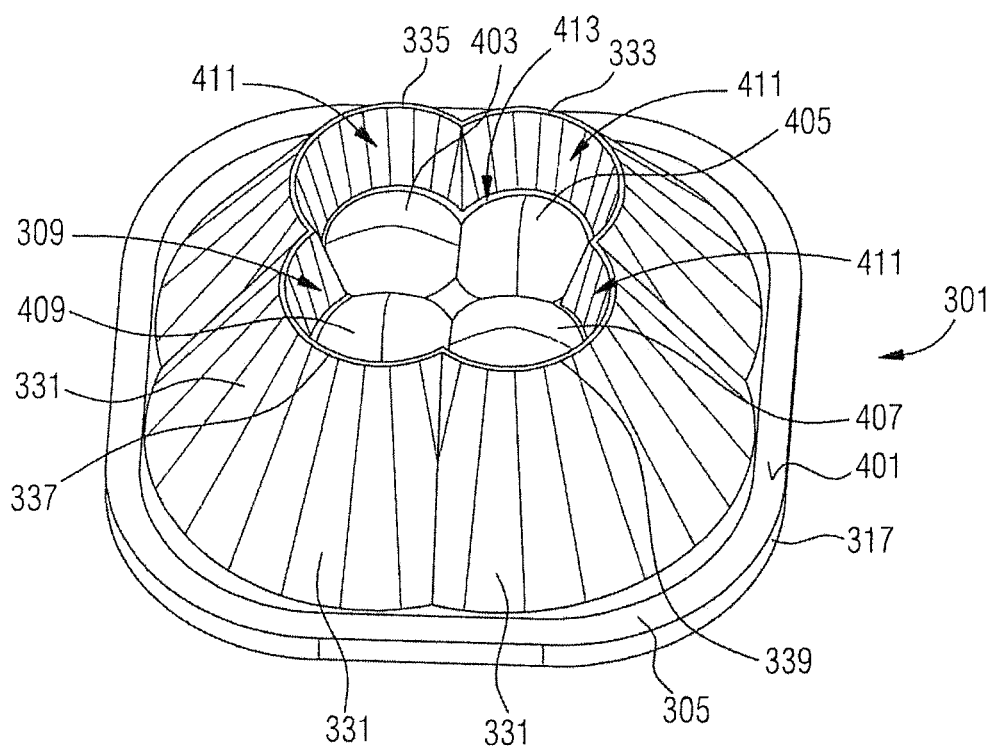
FIG. 4 shows the lens of FIG. 3 in a different view.

FIG. 4 shows the lens of FIG. 3 in an oblique plan view of the rear side 305.

In this view, a mounting flange face 401 of the mounting flange 317 can be seen. In a mounted state, this mounting flange face 401 is seated on a correspondingly configured mounting face of a housing.

The facets 331 extend conically convergently in the direction of the light incidence face 309.

The light incidence face 309 comprises four collimator segments 403, 405, 407, 409. The four collimator segments 403, 405, 407, 409 are respectively formed as a collimator lens. The collimator segments 403, 405, 407, 409 respectively have an optical axis (not shown) extending through the midpoint of the concentric prism rings 329, shown in FIG. 3, of the four back-reflection regions 321, 323, 325, 327. The four collimator segments 403, 405, 407, 409 can therefore respectively collimate light in the direction of the assigned back-reflection regions 321, 323, 325, 327. The back-reflection regions 321, 323, 325, 327 reflect this collimated light back again in the direction of the corresponding collimator segments 403, 405, 407, 409.

The light incidence face 309 furthermore comprises a light incidence region 411 formed differently from the four collimator segments 403, 405, 407, 409. The light incidence region 411 forms a circumferential bounding wall of a depression 413 in which the four collimator segments 403, 405, 407, 409 are arranged or formed. A contour of this depression 413 corresponds to a contour of the arcuate sections 333, 335, 337, 339. The depression 413 therefore has a rosette-shaped contour.

Light entering the base body 307 through the light incidence region 411 strikes the facets 331 and is reflected therefrom in the direction of the microlenses 315, as will be explained in more detail below.

Figure 5:
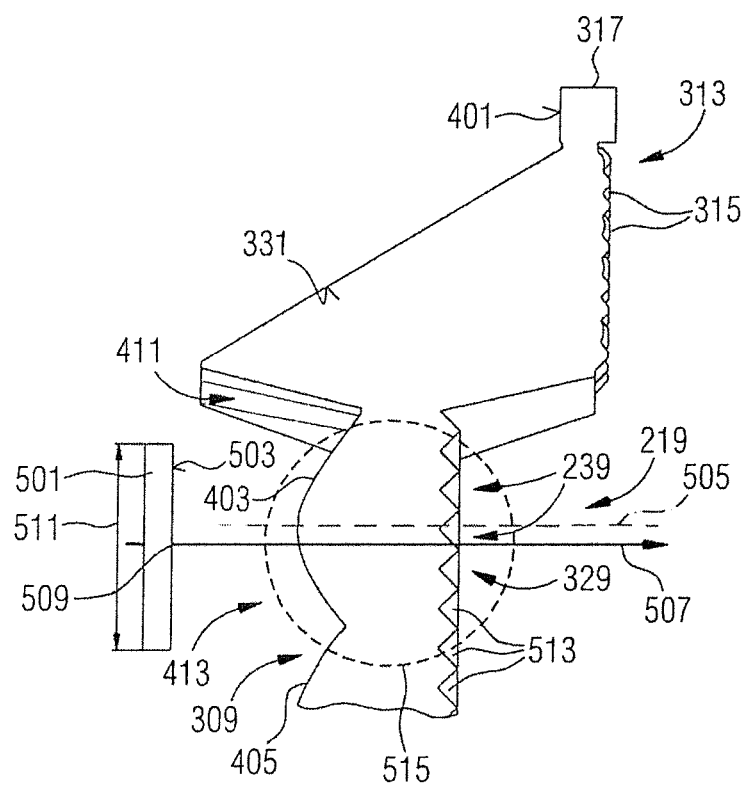
FIG. 5 shows an excerpt of the lens according to FIG. 3 in a lateral sectional view.

FIG. 5 shows an excerpt of the lens 301 according to FIG. 3 in a lateral sectional view.

Also indicated is an optoelectronic semiconductor component 501. The optoelectronic semiconductor component 501 has a light-emitting face 503 facing toward the light incidence face 309. In this case, the light-emitting face 503 faces toward the collimator segment 403. The relative arrangement of the optoelectronic semiconductor component 501 relative to the collimator segment 403 is ideally such that an optical axis 505 of the collimator segment 503 extends through a normal vector 507, this normal vector 507 extending through a midpoint 509 of the light-emitting face 503. This thus means that there is no lateral offset between the normal vector 507 and the optical axis 505. This thus means that, ideally, the optical axis 505 extends through the midpoint 509.

Because of manufacturing tolerances, a deviation from this ideal arrangement may nevertheless occur. According to one example, therefore, the corresponding offset is at most 30% of a side length of the optoelectronic semiconductor component 501. This side length is denoted by a double arrow with the reference 511.

I found that such a maximum offset may be allowed or permitted without collimation by the collimator segment 403 being substantially reduced or impaired. By permitting such a tolerance, a yield during manufacture of optoelectronic lighting devices can thus advantageously be increased.

In FIG. 5 only one optoelectronic semiconductor component 501 is shown, which is assigned to the collimator segment 403. This thus means that the collimator segment 403 collimates light emitted by the light-emitting face 503.

However, the three further collimator segments 405, 407, 409 respectively collimate light of an optoelectronic semiconductor component. This thus means that three further optoelectronic semiconductor components (not shown) are also provided, which are assigned in a similar way as the semiconductor component 501 correspondingly to one of the collimator segments 405, 407, 409 and arranged relative to the corresponding optical axis of these collimator segments.

Thus, an optoelectronic lighting device comprising the lens 301 and four optoelectronic semiconductor components is therefore formed.

The light collimated by the collimator segments 403, 405, 407, 409 is then reflected back by the prism rings 329 in the direction of the collimator segments 403, 405, 407, 409, as will be explained below. The prisms 513 of the prism rings 329 can be seen in the sectional view. These will also be described in more detail below.

Figure 6:
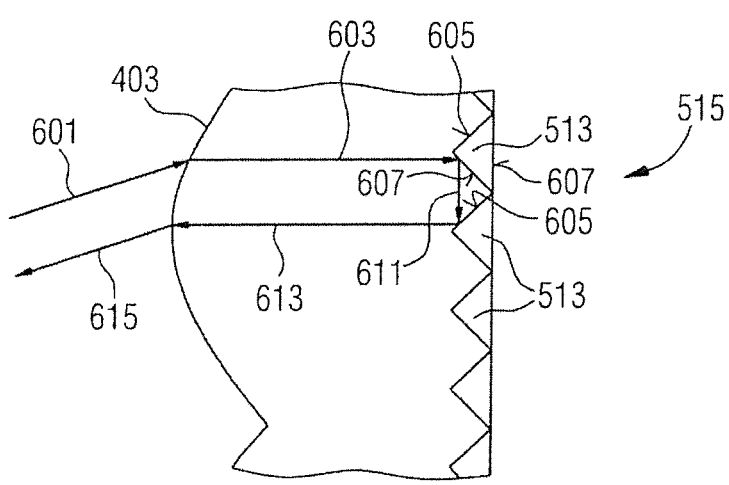
FIG. 6 shows a beam path in the excerpt shown in FIG. 5.

The reference 515 indicates an excerpt which is represented on an enlarged scale in FIG. 6.

FIG. 6 shows a first beam path in the excerpt 515, shown in FIG. 5, in an enlarged view.

Light that has entered the collimator segment 403 is represented symbolically by an arrow with the reference 601. The incident light 601 is collimated. The collimated light is represented by an arrow with the reference 603. The collimator segment 403 thus collimates the incident light 601 in the direction of the prisms 513.

The prisms 513 respectively have a base face 609 and two prism faces 605, 607. The prisms 513 have an isosceles triangle as a base face. The two equal sides of this base face are likewise denoted here by the references 605 and 607 for the sake of simplicity.

The vertex formed by the two prism faces 605, 607 points in the direction of the collimator segment 403.

The collimated light 603 is reflected at the prism face 607 in the direction of a prism face 605 of an adjacently arranged prism 513. This reflected light is symbolically denoted by an arrow with the reference 611. The reflected light 611 is then reflected back by the prism face 605 of the neighboring prism 513 in the direction of the collimator segment 403. This reflected light is symbolically represented by an arrow with the reference 613. The reflected light 613 is then collimated by the collimator segment 403 when this reflected light 613 leaves the collimator segment 403 and emerges again from the base body 307, i.e., from the light incidence face 309. This emergent or collimated light is symbolically denoted by an arrow with the reference 615.

Figure 7:
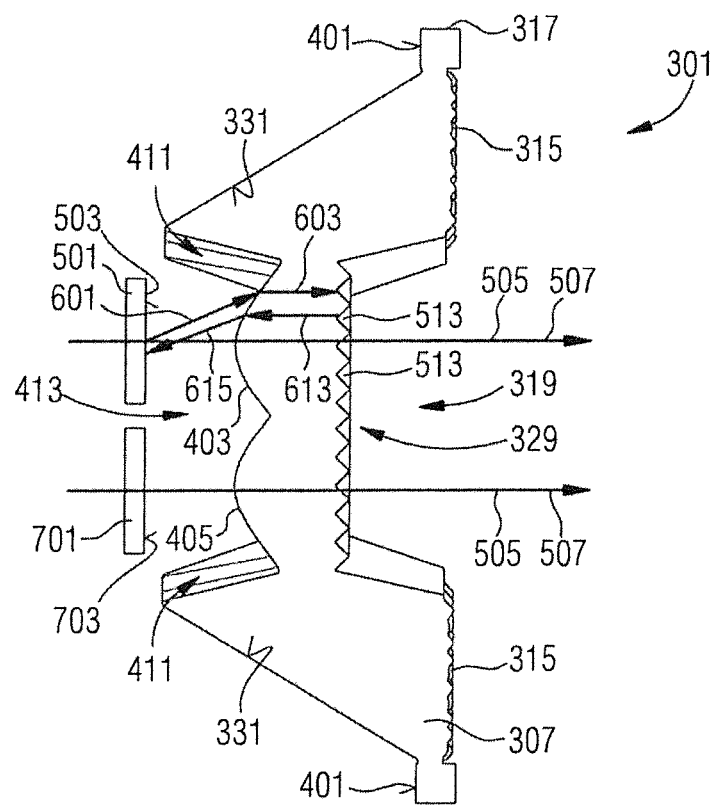
FIG. 7 shows a lateral sectional view of the lens according to FIG. 3.

FIG. 7 shows a lateral sectional view of the lens according to FIG. 3.

In a way corresponding to FIG. 5, the optoelectronic semiconductor component 501 is indicated, the optical axis 505 extending through the normal vector 507. Furthermore, a further optoelectronic semiconductor component 701 having a light-emitting face 703 is indicated. This is assigned in a similar way as the component 501 correspondingly to the collimator segment 405, as already described in connection with FIG. 5.

Furthermore, the beam path according to FIG. 6 is at least partially indicated in FIG. 7.

FIG. 7 therefore clearly illustrates a function of the lens 301. Although light emitted by the optoelectronic semiconductor components 501, 701 in the direction of the collimator segments 403, 405, 407, 409 is collimated, it is then reflected back again in the direction of the semiconductor components 501, 701 by the prisms 513. This thus means that, although this light enters the base body 307, it leaves the base body 307 not through the light exit face 311, but instead again through the light incidence face 309, or more precisely through the corresponding collimator segment. Back-reflection by total reflection thus takes place in the prism rings.

Figure 8:
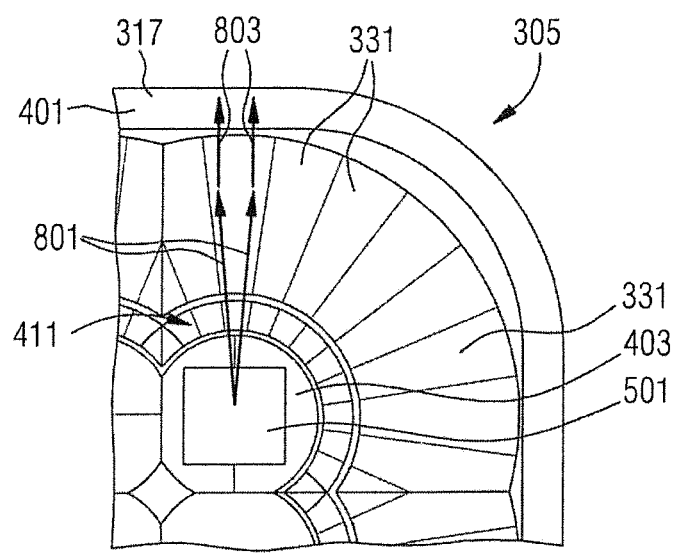
FIG. 8 shows an excerpt of the lens according to FIG. 3 in a plan view.

FIG. 8 shows a plan view of the rear side 305 of an excerpt of the lens 301.

FIG. 8 shows a second beam path of light emitted by the light-emitting face 503 of the semiconductor component 501 in the direction of the light incidence region 411. This thus means that this light is not collimated by the collimator segment 403. The light entering the light incidence region 411 is denoted symbolically by two arrows with the references 801.

The incident light 801 strikes the facets 331 and is reflected by them in the direction of the microlens structure 313 (not shown in FIG. 8) and collimated. The facets 331 have a curvature to collimate the incident light 801 in two spatial directions. The collimated light is denoted symbolically by two arrows with the references 803. This thus means that the facets 331 both reflect the incident light 801 in the direction of the microlens structure 313 and collimate it.

Figure 9:
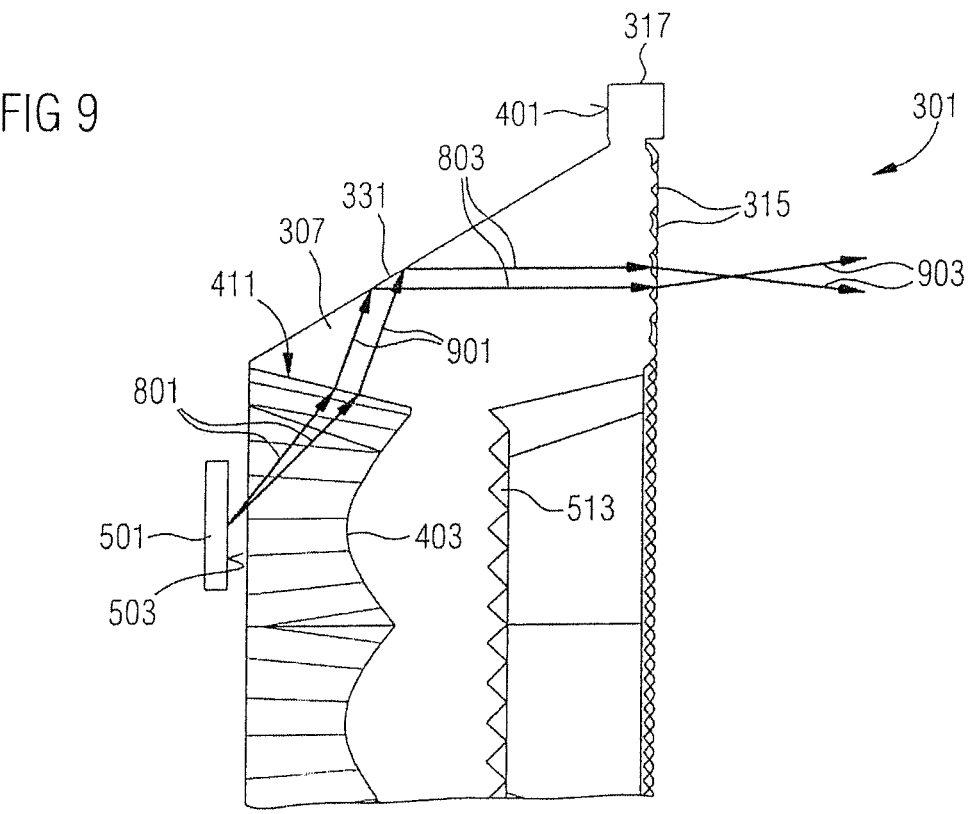
FIG. 9 shows an excerpt of the lens according to FIG. 3 in a lateral sectional view.

FIG. 9 shows an excerpt of the lens according to FIG. 3 in a lateral sectional view to further represent the second beam path explained in connection with FIG. 8.

The incident light 801 is refracted when it enters the base body 307 through the light incidence region 411. This refracted light is represented symbolically by two arrows with the references 901. When this refracted light 901 strikes the facets 331, it is reflected by them in the direction of the microlens structure 313 and collimated. The microlens structure 313 projects this collimated light 803. This projected light is denoted symbolically by two arrows with the references 903.

This thus means that light emitted by the light-emitting face 503 and that does not enter the base body 307 through the collimator segment 403, but instead enters the base body through the light incidence region 411, is deviated because of the refraction at the light incidence region of 411 in the direction of the facets 311, and is reflected from there in the direction of the microlens structure 313 and optically projected by the latter, and then leaves the base body 307 of the lens 301 through the microlens structure 313.

Figure 10:
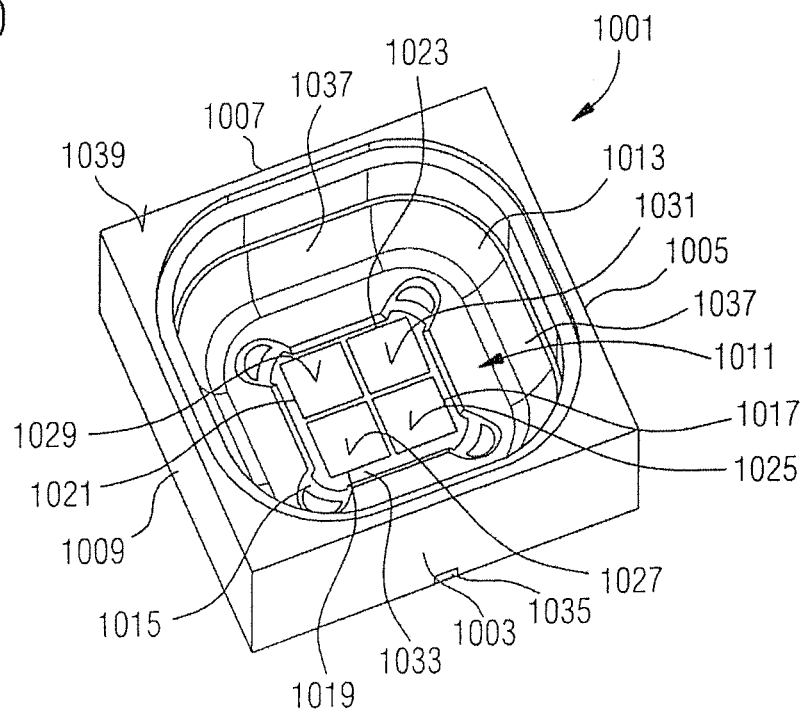
FIG. 10 shows a housing.

FIG. 10 shows a housing 1001 in an oblique plan view from above.

The housing 1001 is formed, for example, as a light box. The housing 1001 has a cuboid shape and, therefore, comprises four side walls 1003, 1005, 1007 and 1009, which enclose an interior 1011. The housing furthermore has a recess 1013, which is formed on an upper side of the housing 1001.

A further recess 1015 is provided opposite this recess 1013. Arranged in this further recess 1015, there are four optoelectronic semiconductor components 1017, 1019, 1021, 1023 arranged in a rectangular arrangement.

The optoelectronic semiconductor component 1017 has a light-emitting face 1025. The semiconductor component 1019 has a light-emitting face 1027. The semiconductor component 1021 has a light-emitting face 1029. The semiconductor component 1023 has a light-emitting face 1031.

These light-emitting faces 1025, 1027, 1029, 1031 are arranged facing toward the recess 1013.

The four semiconductor components 1017, 1019, 1021, 1023 are arranged on a common carrier surface 1033 of a carrier 1035. This means that the housing 1001 is fitted or arranged on the carrier surface 1033 with the further recess 1015 so that in the mounted state the four semiconductor components 1017, 1019, 1021, 1023 are arranged in the further recess 1015.

The four side walls 1003, 1005, 1007, 1009 respectively have a face 1037 facing toward the interior 1011. These faces 1013 have, for example, a reflection coating. These faces 1037 therefore form a reflector for the emitted light of the semiconductor components 1017, 1019, 1021, 1023. These faces 1037 are thus formed or arranged such that they reflect the emitted light in the direction of the recess 1013. They have, for example, an angle relative to the light-emitting faces which is more than 90° degrees.

The housing 1001 furthermore comprises a mounting face 1013 extending around the recess 1013. The mounting flange face 401 of the mounting flange 413 of the lens 301 is placed on this mounting face 1039. The light-emitting faces 1025, 1027, 1029, 1031 therefore face toward the light incidence face 309 of the lens 301.

A respective separating face between the individual semiconductor components 1017, 1019, 1021, 1023 has, for example, a reflection coating. This means that a face that may have a reflection coating is formed between two semiconductor components.

The four semiconductor components 1017, 1019, 1021, 1023 respectively may emit light with a different color. In particular, at least two of these semiconductor components respectively emit light with a different color.

Figure 11:
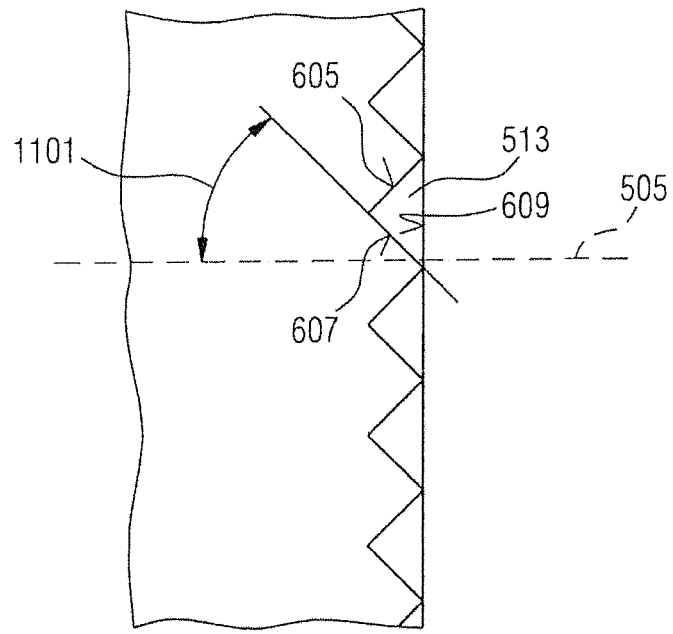
FIG. 11 shows an excerpt of the lens according to FIG. 3 in a lateral sectional view.

FIG. 11 shows an excerpt of the lens 301 according to FIG. 3 in a lateral sectional view.

Represented on an enlarged scale are the prisms 513. An angle between the prism face 607 and the optical axis 505 of the assigned collimator segment is denoted by the reference 1101. The angle 1101 preferably is 40° to 50°.

The prism face 607 and/or the prism face 605 may have a curvature, not shown. The curvature is, for example, a spherical or aspherical curvature. The curvature is, for example, a convex or concave curvature.

Figure 12:
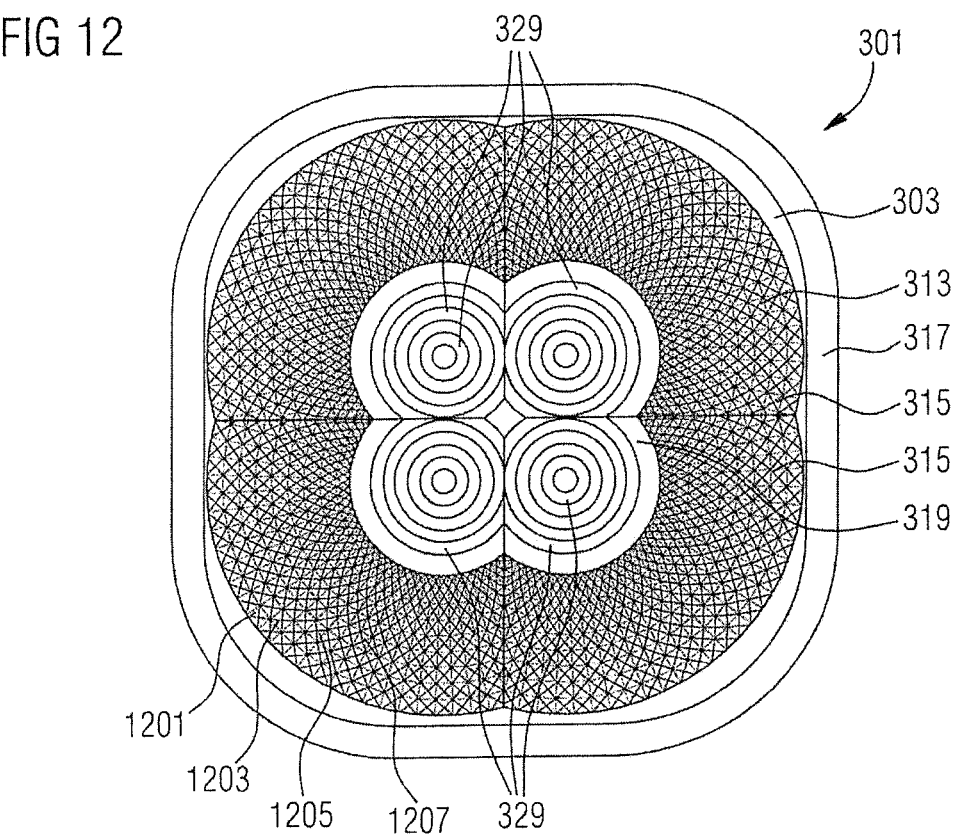
FIG. 12 shows the lens according to FIG. 3 in a plan view of the front side.

FIG. 12 shows the lens 301 according to FIG. 3 in a plan view of the front side 303.

The microlenses 315 are, for example, arranged in rings. This thus means that, for example, lens rings 1201, 1203, 1205, 1207 are formed. For example, provision may be made for the asphericity coefficients of the microlenses 315 to be different from lens ring 1201, 1203, 1205, 1207 to lens ring 1201, 1203, 1205, 1207. In particular, an asphericity coefficient of the microlenses 315 may have a toroidal or x-y polynomial variation.

Toroidal means in particular the following:

The respective lens surface of the microlenses 315 is formed as an excerpt of a torus (i.e., a lens with different focal lengths in the x and y directions).

x-y polynomial means in particular the following: the respective lens shape of the microlenses 315 is formed according to the following analytical description:

$$z = \frac{cr^2}{1 + \sqrt{1 - (1+k)c^2 r^2}} + \sum_{i=1}^{N} A_i E_i(x, y)$$

where N is the number of polynomial coefficients in the series and $A_i$ is the coefficient of the $i^{th}$ expanded polynomial term. The polynomials are a power series in x and y. The first term is x, then y, then x*x, x*y, y*y and the like. There are two first-order terms, three second-order terms, four third-order terms and the like.

The lenses 315 are, for example, arranged along the respective optical axis of the collimator segments 403, 405, 407, 409, i.e., in particular along the associated arcuate section 333, 335, 337, 339. In one example not shown, a stochastic arrangement of the microlenses 315 may be provided. A stochastic arrangement means in particular a random arrangement of the lens midpoints of the microlenses 315 in the plane. In particular, a brand-specific arrangement of the microlenses 315 may be provided. Brand-specific means, in particular, that a particular logo or pattern is formed by the microlenses 315. This thus means that the microlenses 315 are arranged such that they form a particular brand logo or a particular pattern.

Figure 13:
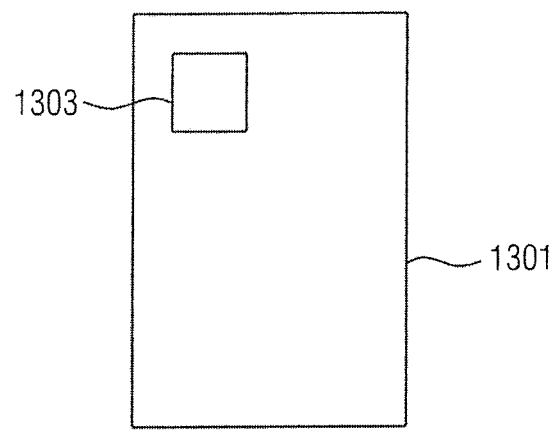
FIG. 13 shows a mobile terminal.

FIG. 13 shows a mobile terminal 1301.

The mobile terminal 1301 comprises an optoelectronic lighting device 1303, for example, as described above. The mobile terminal 1301 is, for example, a smart phone or a cell phone.

The optoelectronic lighting device 1303 may, for example, be formed as a flash. For example, the optoelectronic lighting device may comprise the arrangement according to FIG. 10. This thus means, in particular, that a housing 1001 comprising the common carrier 1035 as well as four semiconductor components 1017, 1019, 1021, 1023 is provided in the mobile terminal 1301. Then, in particular, provision is made for the lens 301, as described in more detail above in connection with the figures, to be arranged on the housing 1001.

In such a flash, efficient color mixing is advantageously made possible. In particular, the problem of color mixing can be solved. This means that emission in all angle ranges has the same color, regardless of which of the semiconductor components 1017, 1019, 1021, 1023 are switched on or off. In this case, a conventional optical element, as described in connection with FIGS. 1 and 2, would project light of an LED chip, i.e., one color, only in a particular spatial direction. Furthermore, the use of an individual single optical element for each semiconductor component would lead to a large space requirement, insofar as the individual semiconductor components need to have a significant spacing between them so that there is sufficient space for the individual single optical elements.

Given a lens as described above, the semiconductor components can be arranged with a much smaller spacing from one another relative to the known components. Thus, for example, a geometrically and/or constructionally minimal distance may be selected between the individual semiconductor components. For example, a side length of a semiconductor component may be 1 mm. The spacing between two semiconductor components may, for example, is 50 μm to 100 μm.

At least two semiconductor components may respectively emit light of a different color.

The semiconductor components may be installed in a housing, particularly in a light box having highly reflective walls (reflection coating of the faces of the side walls which face toward the interior).

A lens may be is positioned over the light-emitting face(s), which lens in particular has the following features:
1. Collimating lens segments are provided directly over the light-emitting faces of the semiconductor components. In particular, principal axes (normal vector) of the light-emitting faces and of the optical axis of the collimating lens segments (collimator segments) may be slightly offset laterally with respect to one another (at most 30% of the side length of a semiconductor component).
2. Totally reflecting prism rings are provided over the lens segments in a cavity or depression applied on the lens front side, the effect of which rings is that light which leaves the collimator segments is directed back again in the direction of the light-emitting faces of the semiconductor components. In particular, the lens does not have a reflective coating (reflection coating), not even in subregions. This thus means, in particular, that the lens, in particular the base body, is free from a reflection coating.
3. Light that does not strike the collimator segments is deviated in the direction of a reflector region of the lens. This light which does not strike the collimator segments enters the base body through the light incidence region. The deviation in the direction of the reflector region of the lens is brought about by refraction of the light at the interface between the surroundings of the base body and the light incidence region. The reflector region of the lens has, in particular, collimating facets. Collimation of this light and deviation in the direction of the front side of the lens thus take place. In particular, a microlens structure having a plurality of microlenses is arranged on the front side comprising the light exit face. The microlens structure, which in general may also be referred to as a lens array, is in particular dimensioned such that each light beam arriving on a sublens of the array is distributed homogeneously over the entire emission region.

The advantages of the above-described concept are, in particular, a compact construction since the semiconductor components can be placed as close as possible to one another.

In particular, the semiconductor components are no longer visible from the outside, which can induce a homogeneous optical impression.

In particular, a brand-specific arrangement of the microlenses of the microlens structure is made possible.

In particular, the lens may be produced economically by an injection-molding process.

Although my components have been illustrated and described in detail by the preferred example, this disclosure is not in this way restricted to the examples disclosed and other variants may be derived therefrom by those skilled in the art without departing from the protective scope of the appended claims.

This application claims priority of DE 10 2015 107 443.5, the subject matter of which is incorporated herein by reference.

The invention claimed is:

1. A lens comprising:
a base body,
wherein the base body has a light incidence face through which light can enter the base body,
the base body has a light exit face through which light which has entered the base body can emerge,
the light exit face comprises a microlens structure having a plurality of microlenses,
the light incidence face has at least two collimator segments that collimate light,
the light incidence face has a light entry region formed differently from the collimator segments,
the base body has at least two back-reflection regions respectively assigned to one of the two collimator segments to reflect back light collimated by a corresponding collimator segment in a direction of the corresponding collimator segment,
the base body is a reflection region to reflect light that has entered through the light incidence region in the direction of the microlens structure so that the reflected light can emerge from the base body through the microlens structure, and
the back-reflection regions respectively comprise one or more prism rings, concentric relative to the optical axis of the collimator segment assigned to the corresponding back-reflection region, comprising a plurality of prisms for total reflection of the collimated light.

2. The lens according to claim 1, wherein an angle between a respective prism face of the prisms of the one or more prism rings and of the corresponding optical axis of the assigned collimator segment is 40° to 50°.

3. The lens according to claim 1, wherein a respective prism face of the prisms has a spherical, aspherical, convex or concave curvature.

4. The lens according to claim 1, wherein the microlenses are formed as aspherical, rotationally symmetrical microlenses respectively having an equal asphericity coefficient or at least partially different asphericity coefficients.

5. The lens according to claim 1, wherein the microlens structure is formed such that each light beam formed by the reflected light and striking a microlens of the microlens structure, has a homogeneous distribution over a predetermined emission region after emerging from the base body.

6. The lens according to claim 1, wherein the reflection region comprises a plurality of facets that collimate the incident light in the direction of the microlens structure.

7. The lens according to claim 6, wherein the facets respectively have a curvature.

8. The lens according to claim 1, wherein the base body is free from a reflection coating.

9. The lens according to claim 1, wherein the base body is fixated as an injection-molded component.

10. The lens according to claim 1, wherein the base body comprises a mounting flange, extending around the microlens structure, for mounting the base body on a housing.

11. The lens according to claim 1, wherein the collimator segments are respectively formed as a collimator lens.

12. The lens according to claim 1, wherein the collimator segments are formed in a depression, bounded by the light incidence region of the base body.

13. An optoelectronic lighting device comprising:
the lens according to claim 1, and
a plurality of optoelectronic semiconductor components, respectively having a light-emitting face facing toward the light incidence face, wherein the plurality of semiconductor components are respectively assigned to one of the collimator segments so that light emitted by the respective light-emitting face of the semiconductor components can be partially collimated by the assigned collimator segment, the collimated light can be reflected back in the direction of the collimator segment by the corresponding back-reflection region, and can be collimated by the collimator segment in the direction of the light-emitting face, and so that the light emitted by the respective light-emitting face of the semiconductor components can enter the base body partially through the light incidence region, can be reflected by the back-reflection region in the direction of the microlens structure, and can emerge from the base body through the microlens structure.

14. The optoelectronic lighting device according to claim 13, wherein a respective separating face fouled between the semiconductor components has a reflection coating that reflects light in the direction of the light incidence face.

15. The optoelectronic lighting device according to claim 13, further comprising a housing having a recess, the semiconductor components being arranged in the housing with the light-emitting faces facing toward the recess, the recess being covered by the base body.

16. The optoelectronic lighting device according to claim 15, wherein the housing comprises a plurality of housing side walls enclosing a housing interior, a respective face, facing toward the housing interior, of the housing side walls having a reflection coating.

17. The optoelectronic lighting device according to claim 15, comprising the lens wherein the base body comprises a mounting flange, extending around the microlens structure, for mounting the base body on a housing, and the housing has a mounting face extending around the recess, the mounting flange of the base body being arranged on the mounting face.

18. The optoelectronic lighting device according to claim 13, wherein the lighting device is configured as a flash.

19. A mobile terminal, comprising the optoelectronic lighting device according to claim 13.

* * * * *